(12) United States Patent
Sun et al.

(10) Patent No.: US 8,452,087 B2
(45) Date of Patent: May 28, 2013

(54) IMAGE SELECTION TECHNIQUES

(75) Inventors: Jian Sun, Beijing (CN); Jiangyu Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 12/571,317

(22) Filed: Sep. 30, 2009

(65) Prior Publication Data

US 2011/0075921 A1    Mar. 31, 2011

(51) Int. Cl.
*G06K 9/34*    (2006.01)

(52) U.S. Cl.
USPC ............................ 382/164; 382/162; 382/173

(58) Field of Classification Search
USPC ................. 382/162, 164, 173, 100, 275, 199, 382/276, 282, 254, 266; 340/541; 348/143, 348/222.1; 703/2
See application file for complete search history.

(56) References Cited

U.S. PATENT DOCUMENTS

| | | | |
|---|---|---|---|
| 4,627,620 A | 12/1986 | Yang | |
| 4,645,458 A | 2/1987 | Williams | |
| 4,695,953 A | 9/1987 | Blair et al. | |
| 4,702,475 A | 10/1987 | Elstein et al. | |
| 4,751,642 A | 6/1988 | Silva et al. | |
| 4,817,950 A | 4/1989 | Goo | |
| 4,843,568 A | 6/1989 | Krueger et al. | |
| 4,901,362 A | 2/1990 | Terzian | |
| 4,925,189 A | 5/1990 | Braeunig | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |

(Continued)

FOREIGN PATENT DOCUMENTS

| | | |
|---|---|---|
| CN | 201254344 | 6/2010 |
| EP | 0583061 | 2/1994 |

(Continued)

OTHER PUBLICATIONS

Garain, et al., "On Foreground-Background Separation in Low Quality Color Document Images", retrieved on Dec. 3, 2009 at <<http://l3iexp.univ-lr.fr/madonne/publications/garain2005a.pdf>>, IEEE Computer Society, Proceedings of International Conference on Document Analysis and Recognition (ICDAR), 2005, pp. 585-589.

(Continued)

*Primary Examiner* — Anh Hong Do
(74) *Attorney, Agent, or Firm* — Lee & Hayes, PLLC

(57) ABSTRACT

Tools disclosed herein comprise progressive, paint stroke based region recognition and selection tools. Using these tools, a user may partially paint a region of interest directly on an image (by using a paint brush or other similar tool). Unlike conventional selection tools, a user is not required to paint the entire region pixel-by-pixel. Rather the desired region is automatically and intelligently recognized based on the partial selection. This is accomplished via a progressive selection algorithm. In addition, these tools provide the ability to quickly execute such region selections on multi-megapixel images.

20 Claims, 5 Drawing Sheets

U.S. PATENT DOCUMENTS

| | | | |
|---|---|---|---|
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,900,953 A | 5/1999 | Bottou et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,151,025 A | 11/2000 | Yen et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,337,925 B1 * | 1/2002 | Cohen et al. ............... 382/199 |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,741,755 B1 | 5/2004 | Blake et al. |
| 6,744,923 B1 | 6/2004 | Zabih et al. |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,973,212 B2 | 12/2005 | Boykov et al. |
| 6,987,535 B1 | 1/2006 | Matsugu et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,079,992 B2 * | 7/2006 | Greiffenhagen et al. ......... 703/2 |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,430,339 B2 | 9/2008 | Rother et al. |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,589,721 B2 | 9/2009 | Lorenz |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,606,417 B2 | 10/2009 | Steinberg et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,778,439 B2 * | 8/2010 | Kondo et al. ............... 382/100 |
| 7,809,167 B2 | 10/2010 | Bell |
| 7,834,846 B1 | 11/2010 | Bell |
| 7,852,262 B2 | 12/2010 | Namineni et al. |
| 7,860,311 B2 * | 12/2010 | Chen et al. ............... 382/173 |
| RE42,256 E | 3/2011 | Edwards |
| 7,898,522 B2 | 3/2011 | Hildreth et al. |

| | | | |
|---|---|---|---|
| 8,004,536 B2 | 8/2011 | Wilensky | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,050,498 B2 | 11/2011 | Wilensky et al. | |
| 8,072,470 B2 | 12/2011 | Marks | |
| 8,155,405 B2 | 4/2012 | Unal et al. | |
| 8,165,369 B2 | 4/2012 | Kubota et al. | |
| 8,170,350 B2 | 5/2012 | Steinberg et al. | |
| 2003/0184815 A1 | 10/2003 | Shiki et al. | |
| 2004/0202369 A1 | 10/2004 | Paragios | |
| 2005/0271273 A1 | 12/2005 | Blake et al. | |
| 2006/0039611 A1 | 2/2006 | Rother et al. | |
| 2006/0285747 A1 | 12/2006 | Blake et al. | |
| 2007/0081710 A1 | 4/2007 | Hong et al. | |
| 2007/0122039 A1 | 5/2007 | Zhang et al. | |
| 2007/0133880 A1 | 6/2007 | Sun et al. | |
| 2007/0165949 A1 | 7/2007 | Sinop et al. | |
| 2007/0211940 A1 | 9/2007 | Fluck et al. | |
| 2007/0216675 A1 | 9/2007 | Sun et al. | |
| 2007/0237393 A1 | 10/2007 | Zhang et al. | |
| 2008/0026838 A1 | 1/2008 | Dunstan et al. | |
| 2008/0120560 A1 | 5/2008 | Cohen et al. | |
| 2008/0136820 A1 | 6/2008 | Yang et al. | |
| 2008/0152231 A1 | 6/2008 | Gokturk et al. | |
| 2008/0260247 A1 | 10/2008 | Grady et al. | |
| 2008/0266432 A1 | 10/2008 | Tsuruoka | |
| 2008/0304698 A1 | 12/2008 | Rasmussen et al. | |
| 2008/0304735 A1 | 12/2008 | Yang et al. | |
| 2009/0033683 A1 | 2/2009 | Schiff et al. | |
| 2009/0060333 A1 | 3/2009 | Singaraju et al. | |
| 2009/0060334 A1 | 3/2009 | Rayner | |
| 2009/0315978 A1 | 12/2009 | Wurmlin et al. | |
| 2010/0104163 A1 | 4/2010 | Li et al. | |
| 2010/0266207 A1 | 10/2010 | Zhang et al. | |
| 2011/0075926 A1 | 3/2011 | Piramuthu et al. | |
| 2011/0254950 A1 | 10/2011 | Bibby et al. | |

FOREIGN PATENT DOCUMENTS

| | | |
|---|---|---|
| JP | 08044490 | 2/1996 |
| WO | WO9310708 | 6/1993 |
| WO | WO9717598 | 5/1997 |
| WO | WO9944698 | 9/1999 |
| WO | WO2008012808 A2 | 1/2008 |
| WO | WO2009093146 (A1) | 7/2009 |
| WO | WO2009101577 (A2) | 8/2009 |

OTHER PUBLICATIONS

Kolmogorov, et al., "Applications of parametric maxflow in computer vision", IEEE International Conference on Computer Vision (ICCV), Rio de Janeiro, BR, Oct. 2007, pp. 1-8.

Lempitsky, et al., "Image Segmentation with a Bounding Box Prior", IEEE International Conference on Computer Vision (ICCV), Kyoto, JP, 2009, pp. 1-8.

Liu, et al., "Paint Selection", retrieved on Dec. 3, 2009 at <<http://yuwing.kaist.ac.kr/courses/CS770/reading/PaintSelection.pdf>>, ACM, Transactions on Graphics (TOG), vol. 28, No. 3, Article 69, Aug. 2009, pp. 1-7.

Lu, et al., "Dynamic Foreground/Background Extraction from Images and Videos using Random Patches", retrieved on Dec. 3, 2009 at <<http://books.nips.cc/papers/files/nips19/NIPS2006_0103.pdf>>, Conference on Neural Information Processing Systems (NIPS), 2006, pp. 351-358.

Mortensen, et al., "Intelligent Selection Tools", retrieved on Dec. 4, 2009 at <<http://web.engr.oregonstate.edu/~enm/publications/CVPR_00/demo.html>>, IEEE Proceedings of Conference on Computer Vision and Pattern Recognition (CVPR), Hilton Head Island, SC, vol. 2, 2000, pp. 776-777.

Tan, et al., "Selecting Objects With Freehand Sketches", retrieved on Dec. 3, 2009 at <<http://citeseerx.ist.psu.edu/viewdoc/download-?doi=10.1.1.83.4105&rep=rep1&type=pdf>>, IEEE Proceedings of International Conference on Computer Vision (ICCV), Vancouver, CA, vol. 1, Jul. 2001, pp. 337-345.

Vicente, et al., "Joint optimization of segmentation and appearance models", IEEE International Conference on Computer Vision (ICCV), Kyoto, JP, Oct. 2009, pp. 1-8.

Adobe Photoshop, retrvied at <<http://www.adobe.com/support/photoshop/>> on Jul. 31, 2009, 7 pages.

An, AppProp: All-Pairs Appearance-Space Edit Propagation, retrieved at <<http://www.cs.dartmouth.edu/~fabio/papers/app-prop08.ppt.pdf>> on Jul. 31, 2009, 36 pages.

Bai et al., A Geodesic Framework for Fast Interactive Image and Video Segmentation and Matting, University of Minnesota, IEEE ICCV 2007, 8 pages.

Blake et al., "Interactive Image Segmentation using an adaptive GMMRF model", Microsoft Research Cambridge UK, May 2004, 14 pages.

Boykov et al., "An Experimental Comparison of Min-Cut/Max-Flow Algorithms for Energy Minimization in Vision", IEEE Transactions on PAMI, vol. 26, No. 9, Sep. 2007, pp. 1124-1137.

Boykov et al., "Interactive Graph Cuts for Optimal Boundary & Region Segmentation of Objects in N-D Images", International Conference on Computer Vision, Jul. 2001, vol. 1, pp. 105-112.

Chen et al., "Real-Time Edge-Aware Image Processing with the Bilateral Grid", SIGGRAPH '07, CSAIL-MIT, pp. 1-34.

Delong et al., "A Scalable Graph-Cut Algorithm for N-D Grids", IEEE Conference on Computer Vision and Pattern Recoignition (CVPR), Jun. 2008, pp. 1-8.

Olsen et al., "Edge-Respecting Brushes", Computer Science Department Brigham Young University, ACM, Oct. 19-22, 2008, pp. 171-180.

Grady, "Random Walks for Image Segmentation", IEEE Transactions on Pattern Analysis and Machine Intelligence, vol. 28, No. 11, Nov. 2006, pp. 1-17.

Kass et al., "Snakes: Active Contour Models", International Journal of Computer Vision, 1988, pp. 321-331.

Kopf et al., "Joint Bilateral Upsampling", retived at <<http://johanneskopf.de/publications/jbu/paper/FinalPaper_0185.pdf>>, on Jul. 31, 2009, 5 pages.

Levin et al., "A Closed-Form Solution to Natural Image Matting", School of Computer Science and Engineering, retrived at <<http://www.wisdom.weizmann.ac.il/~levina/papers/Matting-Levin-Lischinski-Weiss-CVPRO6.pdf>>, Feb. 2008, 8 pages.

Li et al., "Lazy Snapping", retrieved at << http://www.cse.ust.hk/~cktang/sample_pub/lazy_snapping.pdf>>, ACM Inc, 2004, 0730-0301/04.0800-0303, pp. 303-308.

Li et al., "Scribbleboost: Adding Classification to Edge-Aware Interpolation of Local Image and Video Adjustments", Eurographics Symposium on Rendering 2008, vol. 27, No. 4, pp. 1-10.

Lischinski et al., "Interactive Local Adjustment of Tonal Values", retrieved at <<http://www.cs.huji.ac.il/~danix/itm/itm.pdf>> on Jul. 31, 2009, 8 pages.

Lombaert et al., "A Multilevel Banded Graph Cuts Method for Fast Image Segmentation", Tenth IEEE International Conference on Computer Vision, ICCV 2005, vol. 1, pp. 259-265.

Mortensen et al., "Intelligent Scissors for Image Composition", Brigham Young University, retrived at <<http://web.engr.oregonstate.edu/~enm/publications/SIGGRAPH_95/scissors_comp.pdf>>, 1995, 8 pages.

Rother et al., "Grabcut—Interactive Foreground Extraction Using Iterated Graph Cuts", Microsoft Research Cambridge, AK, retrived at <<http://research.microsoft.com/en-us/um/people/ablake/papers/ablake/siggraph04.pdf>>, Aug. 2004, pp. 1-6.

Wang et al., "An Iterative Optimization Approach for Unified Image Segmentation and Matting", retrived at <<http://research.microsoft.com/en-us/um/people/cohen/iccv2005.pdf>>, Oct. 2005, pp. 1-8.

Wang et al., "Soft Scissors: An Interactive Tool for Realtime High Quality Matting", retrived at <<http://juew.org/publication/softscissors-SIG07.pdf>>on Jul. 31, 2009, 6 pages.

"3.18. Stroke Path". retrieved on Dec. 4, 2009 at <<http://docs.gimp.org/en/gimp-path-stroke.html>>, 2009, pp. 1-3.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hertzmann, "Stroke-Based Rendering", retrieved on Dec. 3, 2009 at <<http://www.dgp.toronto.edu/~hertzman/sbr02/hertzmann-sbr02.pdf>>, Recent Advances in NPR for Art and Visualization, SIGGRAPH, vol. 3, 2002, pp. 1-31.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

"Interactive Simulation and Training", 1994, Division Incorporated, 6 pages.

Isard et al., "Condensation—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Kang, et al., "A Unified Scheme for Adaptive Stroke-Based Rendering", retrieved on Dec. 3, 2009 at <<http://www.cs.umsl.edu/~kang/Papers/kang_tvc06.pdf>>, Springer Berlin, The Visual Computer, vol. 22, No. 9-11, Sep. 2006, pp. 814-824.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Mannan, "Interactive Image Segmentation", retrieved on Dec. 2, 2009 at <<http://www.cs.mcgill.ca/~fmanna/ecse626/InteractiveImageSegmentation_Report.pdf>>, McGill University, Montreal, CA, Course ECSE-626: Statistical Computer Vision, 2009, pp. 1-5.

Miyagawa et al., "CCD-Based Range Finding Sensor", Oct. 1997, pp. 1648-1652, vol. 44 No. 10, IEEE Transactions on Electron Devices.

Office action for U.S. Appl. No. 12/718,321, mailed on Aug. 31, 2012, Rother et al., "Image Segmentation Using Reduced Foreground Training Data", 8 pages.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Protiere, et al., "Interactive Image Segmentation via Adaptive Weighted Distances", retrieved on Dec. 2, 2009 at <<http://citeseerx.ist.psu.edu/viewdoc/download?doi=10.1.1.97.776&rep=rep1&type=pdf>>, IEEE Proceedings of Conference on Computer Vision and Pattern Recognition (CVPR), New York, NY, Aug. 2006, pp. 160-167.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Virtual High Anxiety", Tech Update, Aug. 1995, pp. 22.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

Office action for U.S. Appl. No. 12/718,343, mailed on Nov. 8, 2012, Rother et al., "Updating Image Segmentation Following User Input", 58 pages.

Sun et al., "Poisson Matting", ACM SIGGRAPH Conference Proceedings, published 2004, 7 pages.

* cited by examiner

IMAGE SELECTION TECHNIQUES

BACKGROUND

Prior techniques of selecting regions in images have traditionally required tedious pixel-by-pixel region selection. In addition, traditional techniques have required computationally expensive global optimization during the selection process. Global optimization is particularly problematic while working on large images. Specifically, since substantial computation is required for global optimizations, instant selection feedback has not been available on multi-megapixel images. This results in an "act-and-wait" user experience in which a user lacks a feeling of control during region selection. Thus, tools are needed which quickly and intelligently predict which pixels comprise a region, allow selection of the region and give a user instant feedback during the selection process.

SUMMARY

This document describes tools for 1) intelligent paint based recognition and selection of image regions via a progressive selection algorithm; and 2) optimization of the recognition and selection to produce instant selection feedback.

Specifically, these tools may comprise progressive, paint stroke based region recognition and selection tools. Using these tools, a user may partially paint a region of interest directly on an image (by using a paint brush or other similar tools). Unlike conventional selection tools, a user is not required to paint the entire region pixel-by-pixel. Rather the desired region is automatically and intelligently recognized based on the partial selection. This is accomplished via a progressive selection algorithm. In addition, tools are also disclosed that provide the ability to quickly execute such region selections on multi-megapixel images.

This Summary is provided to introduce a collection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

This document describes, in part, tools for 1) intelligent paint based recognition and selection of image regions via a progressive selection algorithm; and 2) optimization of the paint based recognition and selection. The described tools, therefore, provide a plurality of features that are useful in image region recognition and selection.

Specifically, these tools comprise progressive, paint stroke based region recognition and selection tools. Using these tools, a user need only partially paint a region of interest directly on an image (by using a paint brush or other similar tool). Unlike conventional selection tools, a user is not required to paint the entire region pixel-by-pixel. Rather the desired region is automatically and intelligently recognized based on the partial selection. This is accomplished via a progressive selection algorithm.

In addition, these tools provide the ability to quickly execute such region selections on multi-megapixel images. This ability allows instant user feedback even while selecting regions in very large images. This feature is due at least in part to the use of the progressive selection algorithm and a plurality of optimization tools: 1) multi-core graph cutting; and 2) adaptive band upsampling.

The discussion begins with a section entitled "Intelligent Paint Based Selection," which describes one non-limiting environment that may implement the tools described herein. In addition, this section includes the following subsections: Adding Frontal Foreground Pixels and Fluctuation Removal and Stroke Competition. The discussion continues with another section entitled "Optimization of the Paint Base Selection". This section includes the following subsections: Multi-Core Graph Cutting and Adaptive Band Upsampling. Another section follows entitled: discussing viewport based local selection. The discussion concludes with a final section entitled "Illustrative Processes".

This brief introduction, including section titles and corresponding summaries, is provided for the reader's convenience and is not intended to limit the scope of the claims, nor the proceeding sections.

Intelligent Paint Based Selection

Figure 1:
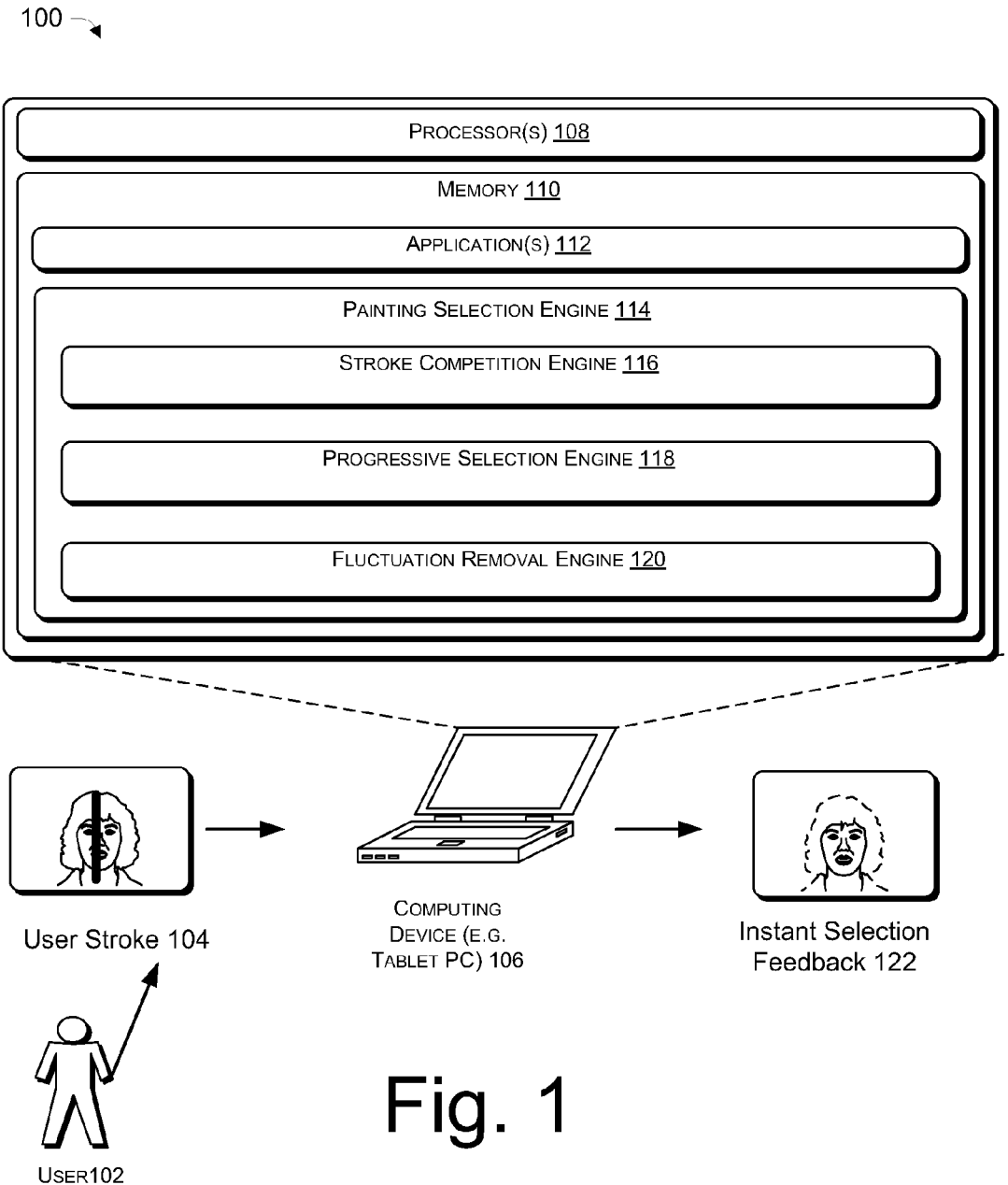
FIG. 1 depicts an illustrative computing device that includes a paint based recognition and selection of an image region via a user stroke.

FIG. 1 depicts an illustrative architecture 100 that may employ the described paint based recognition and selection tools. This architecture includes a user 102 and a user stroke 104 which is created over a region of an image. This image may comprise any sort of image file having any sort of format, such as JPEG, BMP, TIFF, RAW, PNG, GIF etc. The user stroke is input into computing device 106. The user stroke may be input by a mouse, stylus, finger or other similar input device which communicates via wireless/wired connection with the computing device. The user stroke may be via a paint brush stroke or other similar tools. The user stroke need only provide partial selection of the image regions that the user desires to select.

In this embodiment, the paint selection engine allows the computing device to predict the boundaries of the image regions the user actually desired to select. Here, the user selects a region of the image illustrated in FIG. 1, comprising a picture of a human face. As illustrated, even though, the stroke did not select the entire hair and face region of the image pixel-by-pixel, the computing device is able to recognize which pixels comprise particular regions of the image.

As illustrated, a user wishes to select the hair and face regions of the image while leaving the background unselected. This is accomplished via progressive selection engine 118, described in detail below. User stroke 104 provides the computing device with sufficient input to recognize and select the hair and face regions as illustrated in instant selection feedback 122 while not selecting the background. Instant selection feedback may be at a speed in which a user experiences a virtually instantaneous feedback experience or it may be even longer in time. In addition, this selection is displayed to the user virtually instantaneously even when selecting regions of multi-megapixel images. These features will be discussed in detail below.

As illustrated, the paint selection engine also may include a plurality of engines. For instance, the paint selection engine may include a stroke competition engine 116 to allow a user to efficiently deselect an unintended selection. A fluctuation removal engine 120, meanwhile, may allow correction of distracting pixel changes disconnected to the image region the user is focusing on.

As illustrated, computing device 106 includes one or more processors 108 as well as memory 110, upon which application(s) 112 and the paint selection engine 114 may be stored. Computing device may comprise of any sort of device capable of executing computer-executable instructions on a processor. For instance, the device may comprise a personal computer, a laptop computer, a mobile phone, a set-top box, a game console, a personal digital assistant (PDA), a portable media player (PMP) (e.g., a portable video player (PVP) or a digital audio player (DAP)), and the like.

Figure 2:
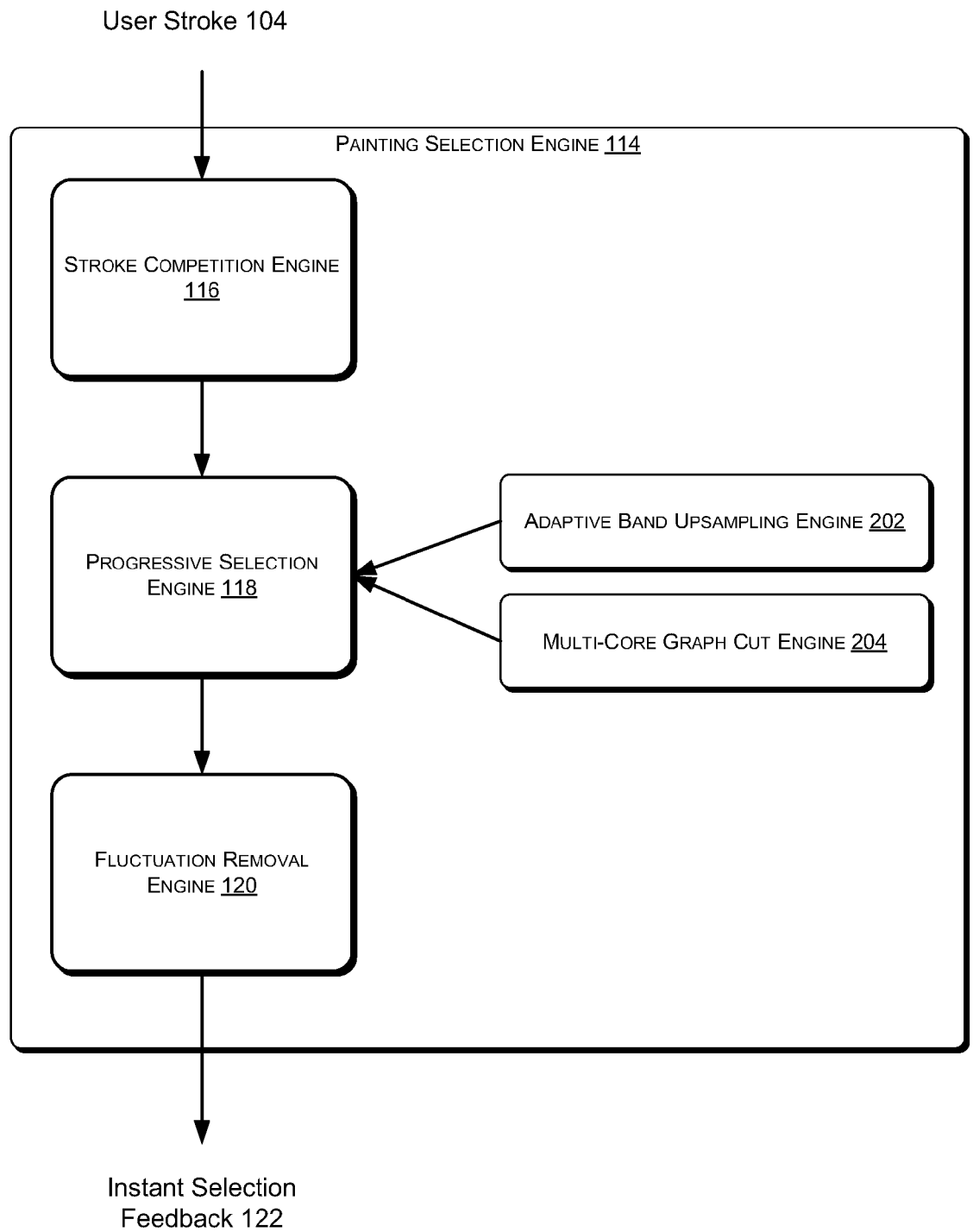
FIG. 2 depicts illustrative engines comprising a non-limiting embodiment of the paint selection engine.

FIG. 2 illustrates an embodiment of the painting selection engine 114. In this embodiment, the painting selection engine first routes the user stroke 104 to the stroke competition engine 116, then to progressive selection engine 118 and finally to fluctuation removal engine 120 before yielding instant selection feedback 122.

As introduced above, the user stroke is first routed to the stroke competition engine. This engine may be used to remove contradicting strokes (or a part of a contradicting stroke) which a user mistakenly painted. Because subsequent engines treat user strokes as definite selections (such as foreground or background), this engine allows quick, intelligent and efficient removal of unintended selections rather than manual pixel-by-pixel deselection. This engine is discussed in detail below.

As illustrated, the user stroke is then routed to the progressive selection engine 118. Here, the progressive selection engine may segment an image into various regions (such as foreground and background regions) and recognize which region a user wishes to select based on the user stroke 104. This selection via the user stroke does not require a user to select the region pixel-by-pixel. In other words even without fully defining a region, a user can select the entire region by only selecting a partial section of a desired region.

The painting selection engine accomplishes this recognition and selection via a progressive selection algorithm. As discussed below, recognition and selection of an entire region is accomplished by a comparison of a plurality of color models at least partially derived from the image. In one embodiment, this may be accomplished by an optimization based on two color models (for instance, foreground and background color models).

For instance, in one non-limiting embodiment, a user partially selects pixels comprising a first region via a user stroke. A first color model associated to the first region is then created and an average color of the selected pixels is determined. Then, a second color model associated with a second region of unselected pixels is created.

In one embodiment to determine if unselected pixels belong to the first region or the second region a comparison of the color of the unselected pixels is executed. Specifically, the color of the unselected pixels is compared to the average color of pixels belonging to the first region and the second region. In one embodiment, this is accomplished first by representing the unselected pixels as nodes in a graph. A graph cut optimization is then conducted to determine which region each pixel is most likely a part of. The likelihood term of the optimization is based on the first color model, and the smoothness term is based on the color similarities of any pair of neighboring pixels. Finally, according to the outcome of the optimization, the pixels belonging to the first (for instance a foreground region) region are selected. Thus, the result is an efficient recognition and selection of an entire region with only partial region selection.

This embodiment also illustrates the interaction between the progressive selection engine and a plurality of optimization engines. These optimization engines include 1) adaptive band upsampling engine 202; and 2) multi-core graph cut engine 204. These engines help optimize the progressive selection algorithm executed in the progressive selection engine. These additional engines are discussed in more detail below.

Figure 3:
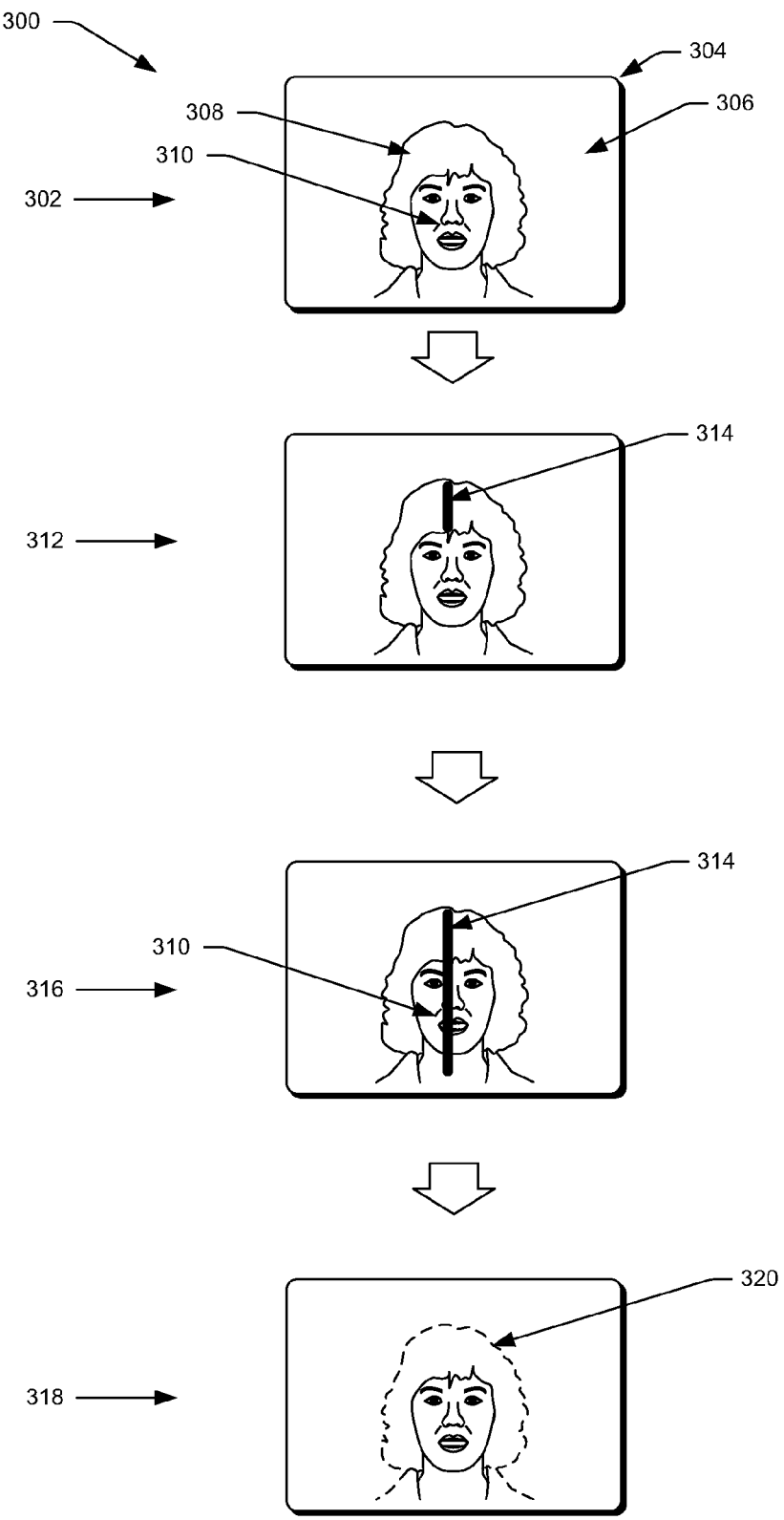
FIG. 3 depicts an illustrative embodiment of paint based recognition and selection of an image region via a user stroke.

FIG. 3 illustrates an embodiment 300 of a user selecting multiple regions with a user stroke via the progressive selection algorithm. At operation 302, an image 304 with a background 306 is illustrated with a hair region 308 and a face region 310. The goal in this embodiment is to select both the entire hair and face regions of the image with only partial selection of the hair and face regions via a user stroke (illustrated here as a paint brush stroke). In other embodiments, only one region or more than two regions may be selected with a single user stroke.

In this non-limiting embodiment, at operation 312, the user first starts the stroke 314 over a portion of the hair region via a paint brush. In this embodiment, a user creates the stroke while holding a left mouse button and dragging the brush across the hair region. The stroke serves to partially select pixels that belong to the desired region. The stroke need not be straight. The stroke may be curved, angular or any other type of shape. In other embodiments, other tools may be used for the region selection such as a digital pen, a touch screen/finger etc. The user need only partially paint the hair region as the selection will be expanded from the selected to the boundaries of the hair region via automatic region recognition.

At operation 316, while still holding down the left mouse button, the user extends stoke 314 over the face region 310. Similar to the hair region, the user need not select the entire region.

In response to the user stroke, the progressive selection engine implements a progressive selection algorithm. This algorithm will assign region labels to the unselected image pixels of the image based only on the partial selection of the regions (the pixels covered by stroke 314). In this instance, the pixels that represent the hair and face regions will be labeled as foreground pixels and the pixels that represent the background 306 will be labeled as background pixels.

Specifically, as stroke 314 covers the pixels belonging to the foreground (hair and face) regions, a foreground color model is generated. The foreground color model determines the likelihood that an unselected pixel belongs to the foreground. A background color model is also generated in response to the stroke at least based on the unselected pixels. The background color model determines the likelihood that an unselected pixel belongs to the background. The unselected pixels are then labeled as either foreground or background based on the unselected pixel's color similarity as compared to the average colors of pixels belonging to the foreground and background models. In one embodiment, this is accomplished via a graph cut optimization conducted over the graph created from the unselected pixels. Once the unselected pixels are assigned labels, the pixels comprising the hair and face regions are selected so that the entire foreground region (here, the hair and face regions) is selected. The regions can then be copied, deleted or otherwise manipulated.

This region recognition and selection may be done in a very short time interval (usually 0.03 to 0.3 seconds for images ranging from 1 megapixels to 40 megapixels). As illustrated in operation 318, this results in the selection being displayed to the user virtually instantaneously after the user provides the stroke. In this embodiment, selection of the hair and face region may be presented to the user with dotted lines 320 around the hair and face regions.

Figure 4:
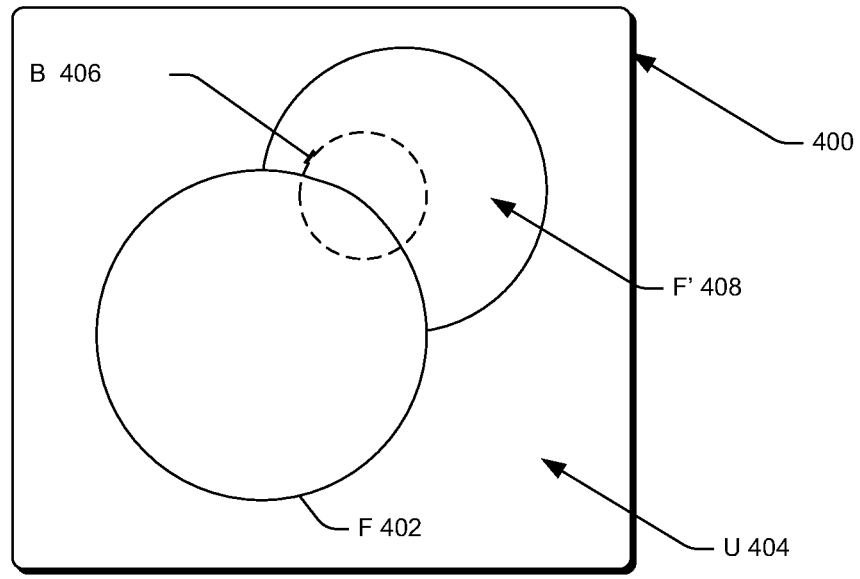
FIGS. 4 and 5 depict an illustrative embodiment of measurements used by the progressive selection algorithm.

FIG. 4 illustrates an exemplary embodiment of region selection via the progressive selection algorithm. As illustrated, the progressive selection engine focuses on enabling region recognition of an image via the user's stroke over a portion of a region(s). The progressive selection engine accomplishes this by labeling the pixels as belonging to a particular region via the progressive selection algorithm.

Pixel labeling via the progressive selection algorithm is the process of determining whether an unselected pixel belongs to a particular region. For instance, in FIG. 3, the user stroke resulted in a determination that the pixels representing unselected portions of the hair and face regions belonged to the hair and face regions. In addition, a determination was made that the unselected pixels representing the background belonged to the background.

To illustrate the method of calculating these determinations, referring to FIG. 4, a user first selects area F 402 on image 400 with a paint brush on the background U 404. Area F will belong to the foreground region. The user then selects area B 406 which in this embodiment overlaps with area F.

Area F' 408 is then immediately computed and added into the existing selection of area F, where F=F∪F'. In other words, F' is a predictor of which pixels will likely be in the foreground region based on the partially selected regions selected via the user's brush stroke(s).

Figure 5:
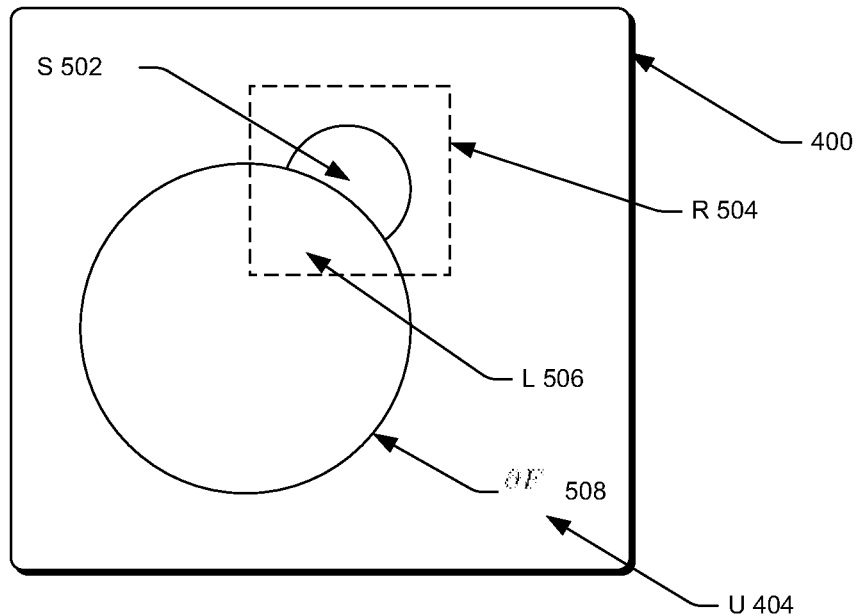

FIG. 5 illustrates an embodiment of determining F'. First, after initial user selection(s) of pixels via a brush stroke, at least two color models are determined. In this embodiment, a foreground and a background color model are determined. In order to generate these models, several measurements are conducted as illustrated in FIG. 5. First, regarding the foreground model, the overlap between area B and U is designated as "seed pixels" which are represented as area S 502, where S=B∩U.

Second, box R 504 is computed by dilating the bounding box of region S with a certain width. In one embodiment, this width is 40 pixels, although other embodiments may use any other suitable width measured in pixels. The pixels contained in both box R and F are designated as area L 506 which are local foreground pixels, where L=R∩F.

Using both the seed pixels and the local foreground pixels, the local foreground model $p^f(\cdot)$ is constructed by fitting a Gaussian Mixture Model (GMM) with four components. The use of the local foreground pixels permits a more stable color estimation of the GMM when the brush or seed pixel regions are relatively small.

Then, the background color model is updated. At the beginning of the user interaction, the background color model $p^b(\cdot)$ (which is a GMM with eight components) is initialized by randomly sampling a number of pixels in the background. In one embodiment, the number of sample pixels is 1,200 pixels. After each user interaction (e.g. as the stroke is elongated), the foreground samples from the previous interaction are replaced with the same number of pixels randomly sampled from the background. The background GMM is then re-estimated using the updated samples.

With these two color models, a multilevel graph cut based optimization is applied to obtain F'. This is obtained by inserting the data in equation 1 into equation 2 and minimizing equation 2. Equation 1 is defined as:

$$E_d(x_p) = (1-x_p) \; \forall p \in S$$

$$E_d(x_p) = x_p \cdot K \; \forall p \in S^B$$

$$E_d(x_p) = x_p \cdot L_p^f + (1-x_p) \cdot L_p^b \; \forall p \in U \setminus (S \cup S^B)$$

Where K is a sufficiently large constant and $I_p$ is the image color at pixel p, $L_p^f = -\ln p^f(I_p)$ and $L_p^b = \ln p^b(I_p)$.

In Eq. 1, the first row is a representation of the region S. The second row is a representation of $S^B$ which are "hard" background strokes (strokes a user uses to expand the background). The third row is a representation of the likely identity of the remaining unselected pixels.

This data is used in equation 2 via the data term $E_d(x_p)$. Equation 2 is defined as: $E(X) = \Sigma_p E_d(x_p) + \lambda \Sigma_{p,q} E_c(x_p, x_q)$, where λ is the weight, $x_p$ encodes the cost of the pixel p (1—foreground, 0—background), $E_c(x_p, x_q) = |x_p x_q| \cdot (\beta \cdot \|I_q I_q\| c)^{-1}$, where ϵ=0.05 and $\beta = (\langle \|I_p - I_q\|^2 \rangle)^{-1}$, $\langle \cdot \rangle$ is the expectation operator over the entire image, and E(X) is a representation of the energy function.

Minimization of this energy function (Eq. 2) results in F'. In other words, the minimization of equation 2 determines if a given pixel will be labeled as belonging to the foreground or background regions.

The resulting progressive selection is also efficient in a variety of ways. First, only the background pixels participate in the optimization in some instances. Second, the data term $E_d(x_p)$ is less ambiguous in most areas since the foreground color model is relatively compact. Third, optimization is enhanced since the boundary of the newly expanded selection in each user interaction is a small fraction of the region boundary. Fourth, the progressive nature of the selection algorithm permits local minimization as opposed to global minimization after each user interaction (e.g. stroke). Thus the progressive selection only requires a series of local minimizations and not a series of global minimizations during the selection process. This provides greatly enhanced usability and selection quality because of the decrease in required computational resources.

Adding Frontal Foreground Pixels

The progressive selection engine may be aided by adding frontal foreground pixels. This process accelerates the region selection process. This process may use equation 3 which is defined as:

$$E_d(x_p) = (1-x_p) \cdot K \; \forall p \in S \cup \partial F$$

Referring to FIG. 5, ∂F 508 is an interior boundary of area F. These pixels are used as frontal foreground pixels to accelerate the expansion speed of the selection. In other words, ∂F is used as a predictor of F'. This may be accomplished by replacing the first row in Eq. 1 with Eq. 3 in which Eq. 3 is used as a hard constraint. This allows a more efficient boundary selection which is reflected in more efficient boundary expansion and faster propagations in smooth regions.

Stroke Competition

Stroke competition engine 116 is an engine which may interact with the progressive selection engine. For instance, this engine is helpful if a user mistakenly selects a region he/she did not intend to select as part of the foreground. In previous systems, a user would have to override the selection pixel-by-pixel because of hard constraints. However, the stroke competition engine allows an intelligent, quick and efficient removal of unintended selections.

For instance, first strokes are segmented via Eq. 4. Eq. 4 is defined as:

$$E_d(x_p)=(1-x_p)\cdot K \quad \forall p \in S$$

$$E_d(x_p)=x_p\cdot L_p(1+x_p)\cdot L_p^b \quad \forall p \in C\backslash S$$

In Eq. 4, C is an existing stroke which conflicts with the new stroke S. The conflicting stroke is segmented by the graph cut based segmentation in Eq. 4. Eq. 4 therefore permits an estimation of the color model $p^b(I_p)$ using all the pixels within the stroke C. This enables a user to override conflicting strokes and freely select/deselect regions without selecting/deselecting individual pixels.

Fluctuation Removal

Another process which may enhance progressive selection is fluctuation removal via the fluctuation removal engine 120. This process allows a user to reject non-local pixel label changes (global label changes). Fluctuations are problematic when a user changes his/her region selection locally, (close to his/her paint brush). As a result of these changes, unintentional changes occur in some parts of the selection far from the local region. These changes occur because optimization may occur globally as opposed to locally due to unavoidable and unintended color ambiguity during minimization. The resulting effect is distracting to users.

The fluctuation removal engine may remove fluctuation by assuming that the user merely wants to make a new selection near the brush. After the progressive labeling process, the new selection(s) may consist of several disconnected regions from the effects of fluctuation. Consequently, regions which are not connected to seed pixels are rejected. The resulting effect is that the rejection of these new F's, only allows local changes. This allows a user to preserve existing selections which are far away from the brush while eliminating fluctuation.

Optimization of the Paint Based Selection

As introduced above, several optimization engines may enhance the efficiency of the progressive selection engine. For instance, in one embodiment, progressive selection is used in conjunction with the optimization engines discussed below to reduce the number of pixels considered during user selection. This greatly accelerates user feedback during region selection.

Multi-Core Graph Cutting

Multi-core graph cut engine 204, as discussed above, is one engine that may aid in the optimization of the progressive selection engine. This engine permits parallelization of the selection process. Specifically, a multi-core graph cut engine allows of Eq. 2 to be minimized concurrently. This allows multi-core processors to compute the minimization significantly faster compared to a single core processor. This engine may be used with or without the adaptive band upsampling engine 202.

As such, multi-core graph cut engine serves to parallelize a sequential augmenting path based dynamic tree algorithm without computationally expensive synchronizations. In one non-limiting embodiment, a graph representing unselected pixels is created. In this graph, each graph node represents a pixel in the image. In addition, an extra source node and sink node representing foreground and background are added into the graph; the edge capacities of the graph are determined by Eq. 2.

The graph is then divided into disjoint subgraphs. In one embodiment, the number of subgraphs is identical to the number of processor cores that the minimization will be executed on.

Once the subgraphs are determined, augmenting paths in the plurality of subgraphs are calculated concurrently. When any one of the subgraphs cannot find an augmenting path from the source node to the sink node, the entire graph is re-partitioned into different disjoint subgraphs and concurrently searched for augmenting paths again. The resulting new partition(s) allows paths to be found that could not be found in the previous partition(s). This process is iterated until no augmenting path can be found in two successive iterations. In other words, the process is carried out concurrently until the energy function cannot be concurrently minimized any further.

In order to allocate balanced processor-core workloads, in one embodiment, the active nodes are dynamically partitioned in the graph so that each processor core processes the subgraphs with an equal number of active nodes. This results in a roughly balanced division of workload per processor core.

Adaptive Band Upsampling

In addition to the multi-core graph cut engine, an adaptive band upsampling engine 204 also aids in enhancing the efficiency of the progressive selection engine. Specifically, this engine focuses on reducing the number of pixels that require consideration in region borders. More specifically, this engine reduces the number of pixels in region boarders that will be minimized via Eq. 2. This enhancement may occur via a multilevel optimization framework via the painting selection engine. In one embodiment, the engine computes a selection in a coarse detail level, and then upsamples the selection through energy minimization in a band around the selection on a finer detail level.

More specifically, in this embodiment, this engine first creates a fixed width narrow band from a low-resolution version of an image. The fixed narrow band is typically created by dilating the border pixels by +/−2 pixels. This serves as a foreground mask. Second, the fixed narrow band is upsampled using Joint Bilateral Upsampling (JBU) to create an adaptive narrow band. Specifically, for each pixel P in the upper narrow band, its upsampled value $x_p$ is:

$$x_p = \frac{1}{k_p}\sum_{q_\downarrow \in \Omega} x_{q\downarrow} f(\|p_\downarrow - q_\downarrow\|)g(\|I_p - I_q\|).$$

Where f(·) and g(·) and spatial and range Gaussian kernels $p\downarrow$ and $q\downarrow$ are coarse level coordinates, $\{x_{q\downarrow}\}$ is a coarse result, $\Omega$ is a 5×5 spatial support centered at $p\downarrow$ and $k_p$ is a normalization factor.

Note that the upsampled value itself is a reasonable approximation of the alpha matte, which represents the pixel semi-transparencies around the selection boundary. This value is therefore used to generate an adaptive narrow band. In one embodiment, pixels are labeled in the fixed narrow band (as foreground or background) if the upsampled value $x_p$ is out of the range [0.25, 0.75]. The resulting adaptive narrow band is then narrowed around the sharp edges of the region and kept wider around lower contrast boundaries. The adaptive narrow band upsampling serves to reduce the size of the graph without sacrificing image details. More specifically, the adaptive narrow band's application to the high resolution image reduces the resulting graph before minimization of Eq. 2, which results in faster minimization speed. In addition, in order to produce a seamless connection between region borders, frontal foreground pixels neighbored to the narrow band may be added as foreground hard constraints.

For the multilevel optimization, the size of the coarsest image and the number of levels of the graph may need to be determined. In one embodiment, the coarsest image dimensions are determined by down sampling (while keeping the original aspect ratio) the input so that (w*h)^(½) is equal to a pre-determined value, where w and h are width and height of the coarsest image. Then the number of levels is automatically set so that the down sampling ratio between two successive levels is about 3.0. For example, in one embodiment, the number of levels will be four for a 20 megapixel image if the pre-determined value for the coarsest level is 400.

Viewport Based Local Selection

An optional feature available to a user using the progressive selection engine is viewport based local selection. This feature allows the user to zoom in and select fine details of the image via a dynamic local window. The dynamic local window is typically centered around the local area that the user is currently focusing on. This feature serves to further accelerate optimization. This is particularly useful if the downsampling ratio (the input image to the coarsest image) is large. Large downsampling ratios are problematic because the resulting segmentation accuracy in the coarsest image decreases which makes the selection difficult for thin regions.

The size of the dynamic local window may be based on the current zooming ratio which in turn, may be the displayed image size over the actual image size. To create the dynamic local window, first, a brush window centered around the user's brush is constructed. The extent of the brush window may be equal to the viewport (screen region) size. A minimal area window may then be defined. This window will contain both the brush window and the screen region. This is the dynamic local window. The contents of the window will be the only region which will be optimized via minimization of Eq. 2. The use of the dynamic local window results in a decrease in the downsampling ratio of the coarsest image because the size of the local window is typically smaller than the input image.

In addition, during local selection via the dynamic local window-background pixels adjacent (outside) to the local window may be added as background hard constraints.

Illustrative Processes

Figure 6:
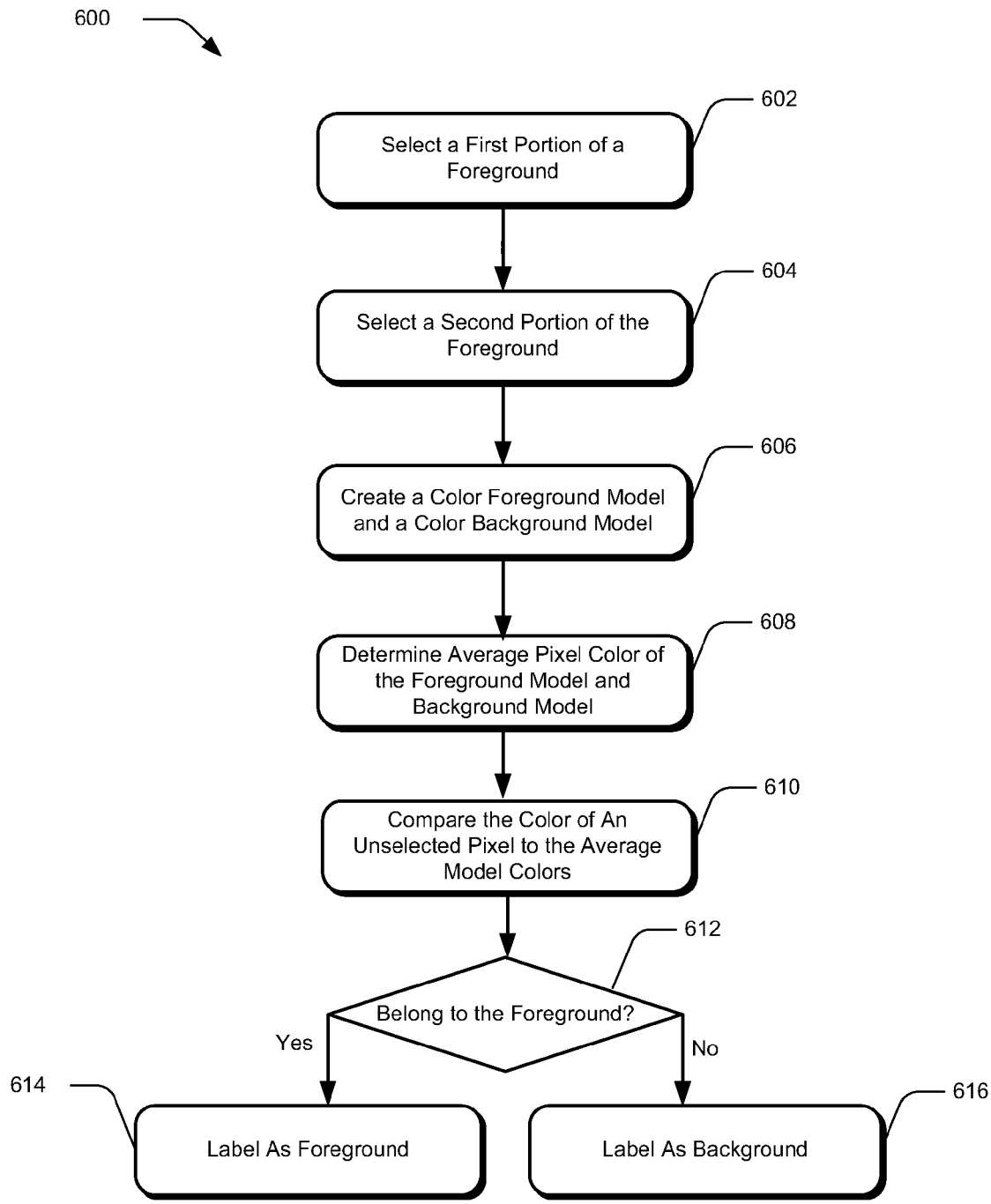
FIG. 6 depicts an illustrative process for the paint based region selection.

FIG. 6 describes an example process 600 for employing the tools discussed above. Specifically, FIG. 6 presents an illustrative process for employing the paint based region recognition and selection techniques illustrated and described above. This process is illustrated as a logical flow graph, which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Process 600 includes an operation 602 in which a user first selects a first portion of the image. Typically, this portion is part of the image foreground. In one embodiment, a user may select this portion via a left mouse button click and dragging a paint brush tool across a portion of the image. As in FIG. 3 above, the user may select the foreground region for deletion, copying or to perform any other sort of manipulation.

Second, at operation 604, a second portion of the foreground is selected in a manner similar to the first portion. In one embodiment, process 600 may omit operation 602 or 604. In other words, only a single portion of the foreground need be selected. At operation 606, a color foreground model and a color background model are created. The color foreground model may be based at least on the user selected portion(s). At operation 608, the average color of a pixel from each model is determined.

At operation 610, the color of an unselected pixel is compared to the average color of the models. Using this information, at operation 612, a determination is made regarding whether the unselected pixel belongs to the color foreground model or the color background model. Specifically, it is determined whether the color of the unselected pixel resembles the color foreground model or the color background model more closely. If the unselected pixel's color resembles the average color of a pixel belonging to the color foreground model, then this pixel is labeled as belonging to the foreground (operation 614). If, however, the pixel's color more closely resembles that of an average pixel of the color background model, then the pixel is labeled as a background pixel (operation 616). In one embodiment, each of the unselected pixels is assigned to one of the models.

In one embodiment, operations 608-616 are carried out via an optimization conducted on a multilevel the graph created from the unselected pixels. Each node within the graph represents an unselected pixel. An extra source node and sink node are added to the graph which represents the foreground and background.

The optimization of this graph determines the label of each unselected pixel according to Eq. 2. The likelihood term of the optimization is based on the foreground and background color models, and the smoothness term is based on the color similarities between any pair of neighboring pixels. As described above, this optimization is optionally accelerated by multi-core graph cutting and adaptive band upsampling. Once pixels are assigned the proper labels, the regions may be selected and manipulated as the user desires.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more processor-accessible media comprising processor-executable instructions that, when executed, direct a device to perform actions comprising:
 a. selecting a portion of a foreground region of an image;
 b. creating a color foreground model based at least on the selected portion;
 c. creating a color background model based at least on the remaining unselected portion of the image;
 d. determining whether unselected pixels belonging to the unselected portion are foreground pixels that form a portion of the foreground region or background pixels that form a portion of a background region based at least on the color foreground model and the color background model;
 e. at least partly in response to determining that unselected pixels are foreground pixels that form a portion of the foreground region, labeling the unselected pixels of the image as foreground pixels; and
 f. at least partly in response to determining that unselected pixels are background pixels that form a portion of the background region, labeling the unselected pixels as background pixels; and g. wherein the determining if unselected pixels are foreground pixels or background pixels comprises:
   i. determining an average pixel color of the pixels comprising the foreground model;
   ii. determining an average pixel color of the pixels comprising the background model; and
   iii. comparing the color of an unselected pixel of the image to the average pixel color of the foreground model and the average pixel of the background model.

2. The one or more processor-accessible media as recited in claim 1, wherein the comparing comprises minimization of an energy function: $E(X)=\Sigma_p E_d(x_p)+\lambda \Sigma_{p,q} E_c(x_p,x_q)$, where $\lambda$ is weight, $x_p$ encodes a cost of pixel p, $E_c(x_p,x_q)=|x_p-x_q| \cdot (\beta \cdot \|I_p-I_q\| \epsilon)^{-1}$, where $\epsilon=0.05$ and $\beta=(\cong \|I_p-I_q\|^2 \approx)^{-1}$, $\langle \rangle$ is the expectation operator over the entire image, $E(X)$ is a representation of the energy function, $E_d(x_p)$ is a data term, X is a label of each pixel, $X_p$ is a label of pixel p, $X_q$ is a label of pixel q, I is a pixel color, $I_p$ is the color of pixel p, and $I_q$ is the color of pixel q.

3. The one or more processor-accessible media as recited in claim 2, wherein the minimization of the energy function is computed in parallel via multiple processor-cores by:
   i. extracting a plurality of nodes from $E(X)=\Sigma_p E_d(x_p)+\lambda \Sigma_{p,q} E_c(x_p,x_q)$,
   ii. creating a graph based at least on the plurality nodes;
   iii. dividing the graph into a plurality of subgraphs; and
   iv. concurrently determining an augmenting path in the plurality of subgraphs.

4. The one or more processor-accessible media as recited in claim 3, wherein the number of subgraphs is equal to a number of processor-cores of a computing device that the parallel computation will be executed on.

5. The one or more processor-accessible media as recited in claim 2, wherein the minimization of the energy function further comprises:
   creating a graph where each graph node represents an unselected pixel; and
   optimizing the graph.

6. The one or more processor-accessible media as recited in claim 1, further comprising instructions in the memory for:
   a. defining borders between the foreground region and a background region by:
      i. creating a fixed narrow band from a low resolution version of the image;
      ii. creating an adaptive band based at least partially on the fixed narrow band;
      iii. overlaying the adaptive band over a high resolution version of the image; and
      iv. labeling pixels in the adaptive band as either foreground pixels or background pixels.

7. The one or more processor-accessible media as recited in claim 1, wherein the foreground color model comprises a Gaussian Mixture Model.

8. One or more processor-accessible media comprising processor-executable instructions that, when executed, direct a device to perform actions comprising:
   a. selecting a portion of a foreground region of an image;
   b. creating a color foreground model based at least on the selected portion;
   c. creating a color background color model based at least on a portion of the remaining unselected portion of the image; and
   d. determining whether unselected pixels belonging to the unselected portion are foreground pixels that form a portion of the foreground region or background pixels that form a portion of a background region based at least on the color foreground model and the color background model:
      i. at least partially in response to determining that unselected pixels are foreground pixels that form a portion of the foreground region, labeling the unselected pixels of the image as foreground pixels; and
      ii. at least partly in response to determining that unselected pixels are background pixels that form a portion of the background region, labeling the unselected pixels as background pixels.

9. The one or more processor-accessible media as recited in claim 8, wherein the determining if unselected pixels are foreground pixels or background pixels comprises:
   a. determining an average pixel color of the pixels comprising the background model; and
   b. comparing the color of an unselected pixel of the image to the average pixel color of the foreground model and the average pixel background model.

10. The one or more processor-accessible media as recited in claim 9, wherein the comparing comprises minimization of an energy function: $E(X)=\Sigma_p E_d(x_p)+\lambda \Sigma_{p,q} E_c(x_p,x_q)$, where $\lambda$ is weight, $x_p$ encodes a cost of pixel p, $E_c(x_p,x_q)=\|x_p-x_q\| \cdot (\beta \cdot \|I_p-I_q\|+\epsilon)^1$, where $\epsilon=0.05$ and $\beta=(\langle \|I_p-I_q\|^2 \rangle )^{-1}$, $\langle \rangle$ is the expectation operator over the entire image, $E(X)$ is a representation of the energy function, $E_d(x_p)$ is a data term, X is a label of each pixel, $X_p$ is a label of pixel p, $X_q$ is a label of pixel q, I is a pixel color, $I_p$ is the color of pixel p, and $I_q$ is the color of pixel q.

11. The one or more processor-accessible media as recited in claim 10, wherein the minimization of the energy function is computed in parallel via multiple processor-sores by:
   i. extracting a plurality of nodes from $E(X)=\Sigma_p E_d(x_p)+\lambda \Sigma_{p,q} E_c(x_p,x_q)$;
   ii. creating a graph based at least on the plurality nodes;
   iii. dividing the graph into a plurality of subgraphs; and
   iv. concurrently determining an augmenting path in the plurality of subgraphs.

12. The one or more processor-accessible media as recited in claim 11, wherein the number of subgraphs is equal to a number of processor-cores of a computing device that the parallel computation will be executed on.

13. The one or more processor-accessible media as recited in claim 8, further comprising instructions in the memory for:
   a. defining borders between the foreground region and a background region by:
      i. creating a fixed narrow band from a low resolution version of the image;
      ii. creating an adaptive band based at least partially on the fixed narrow band;
      iii. overlaying the adaptive band over a high resolution version of the image; and
      iv. labeling pixels in the adaptive band as either foreground pixels or background pixels.

14. The one or more processor-accessible media as recited in claim 8, wherein the selection of the foreground portion is done via at least one paint brush stroke.

15. The one or more processor-accessible media as recited in claim 8, the foreground color model comprises a Gaussian Mixture Model.

16. A computing device comprising:
   a processor;
   a memory coupled to the processor, the memory comprising computer-program instructions executable by the processor for:
   a. selecting a portion of a foreground region of an image;
   b. creating a color foreground model based at least on the selected portion;

c. creating a color background model based at least on a portion of the remaining unselected portion of the image;

d. determining if unselected pixels belonging to the unselected portion are foreground pixels that form a portion of the foreground region or background pixels that form a portion of a background region based at least on the color foreground model and the color background model:

i. at least partly in response to determining that unselected pixels are foreground pixels, that form a portion of the foreground region, labeling the unselected pixels of the image as foreground pixels; and ii. at least partly in response to determining that unselected pixels are background pixels that form a portion of the background region, labeling the unselected pixels as background pixels.

17. The computing device of claim 16, wherein the determining if unselected pixels are foreground pixels or background pixels comprises:

a. determining an average pixel color of the pixels comprising the foreground model;

b. determining an average pixel color of the pixels comprising the of the background model; and c. comparing the color of an unselected pixel of the image to the average pixel color of the foreground model and the average pixel of the background model.

18. The computing device of claim 17, wherein the comparing comprises minimization of an energy function: $E(X) = \Sigma_p E_d(x_p) \lambda \Sigma_{p,q} E_c(x_p, x_q)$, where $\lambda$ is weight, $x_p$ encodes a cost of pixel p, $E_c(x_p, x_q) = |_p - x_q| \cdot (\beta \cdot \|I_p - I_q\| + \epsilon)^1$, where $\epsilon = 0.05$ and $\beta = (\langle \|I_p - I_q\|^2 \rangle)^{-1}$, $\langle \cdot \rangle$ is the expectation operator over the entire image, $E(X)$ is a representation of the energy function, $E_d(x_p)$ is a data term, X is a label of each pixel, $X_p$ is a label of pixel p, $X_q$ is a label of pixel q, I is a pixel color, $I_p$ is the color of pixel p, and $I_q$ is the color of pixel q.

19. The computing device of claim 16, wherein the selection of foreground portion is done via at least one paint brush stroke.

20. The computing device of claim 16, the foreground color model comprises a Gaussian Mixture Model.

* * * * *